United States Patent
Jameson

(10) Patent No.: US 8,365,387 B2
(45) Date of Patent: Feb. 5, 2013

(54) METHOD OF FORMING A RIVET AND SECURING A PIECE OF MATERIAL

(75) Inventor: Jonathan Jameson, Dalton, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 555 days.

(21) Appl. No.: 12/575,616

(22) Filed: Oct. 8, 2009

(65) Prior Publication Data

US 2010/0088881 A1  Apr. 15, 2010

Related U.S. Application Data

(60) Provisional application No. 61/196,149, filed on Oct. 15, 2008.

(51) Int. Cl.
*B21D 39/00* (2006.01)
*B21J 15/04* (2006.01)

(52) U.S. Cl. ... 29/509; 29/524.1; 29/525.05; 29/525.06; 411/501; 403/282

(58) Field of Classification Search ............... 29/524.1, 29/525.05, 525.06, 509, 521, 522.1, 523; 411/501, 15; 403/280, 282
See application file for complete search history.

(56) References Cited

U.S. PATENT DOCUMENTS

| | | | | |
|---|---|---|---|---|
| 2,321,755 A | * | 6/1943 | Kost | 52/592.3 |
| 2,492,579 A | * | 12/1949 | Kahn | 29/421.1 |
| 3,557,441 A | * | 1/1971 | Boik et al. | 29/509 |
| 3,688,385 A | * | 9/1972 | Brown | 29/509 |
| 3,750,606 A | * | 8/1973 | Schultz | 29/524.1 |
| 4,635,775 A | | 1/1987 | Kohler | |
| 6,702,535 B1 | | 3/2004 | Stevenson et al. | |

* cited by examiner

*Primary Examiner* — Jermie Cozart
(74) *Attorney, Agent, or Firm* — Simpson & Simpson, PLLC

(57) ABSTRACT

A rivet, including: at least one side wall extending from a first side of a sheet of material, formed from the same material as the sheet of material, and including respective inside surfaces; and a space at least partly enclosed by the respective inside surfaces. The space is open at a second side of the sheet of material. In one embodiment, the at least one side wall is cylindrical in shape. In another embodiment, the rivet includes an end wall formed of the same piece of material as the at least one side wall and defining one end of the space, the space is cylindrical in shape, the space has a first portion aligned with the sheet of material and a second portion partially defined by the end wall, and a diameter for the first portion is less than the diameter for the second portion.

7 Claims, 2 Drawing Sheets

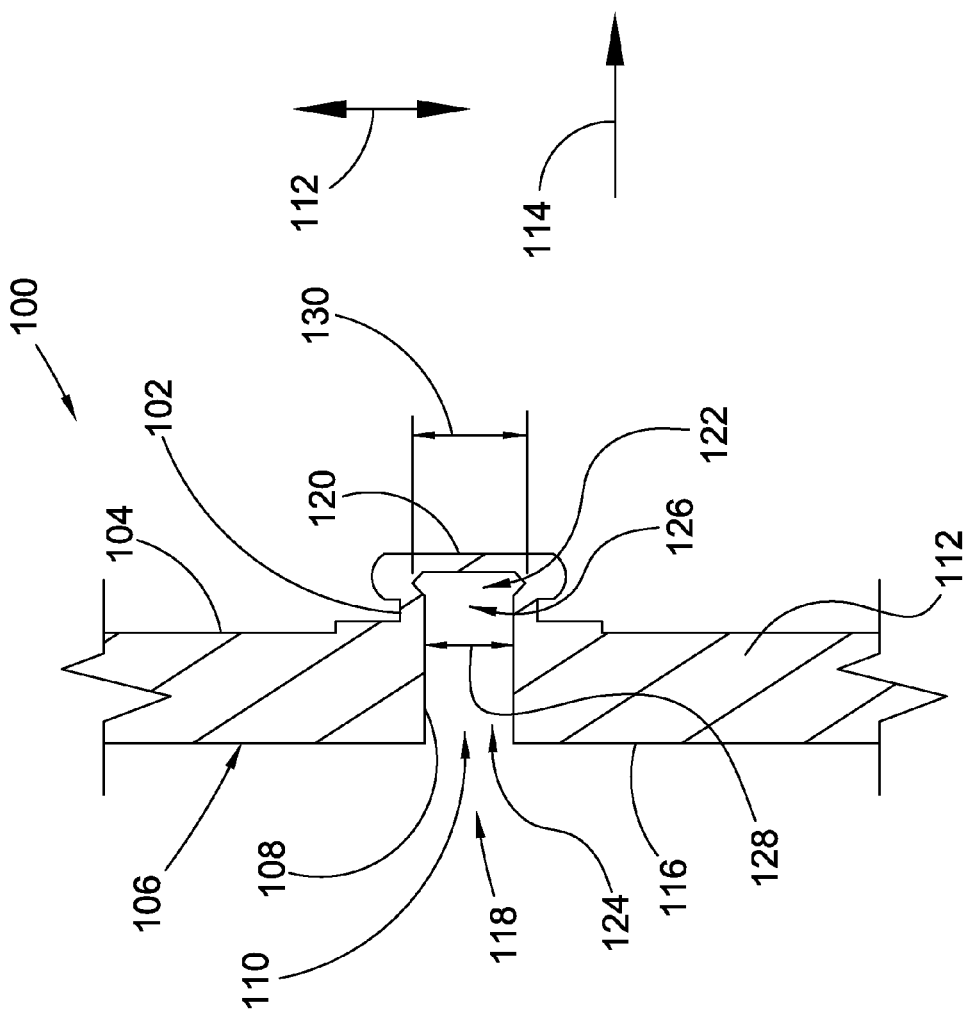

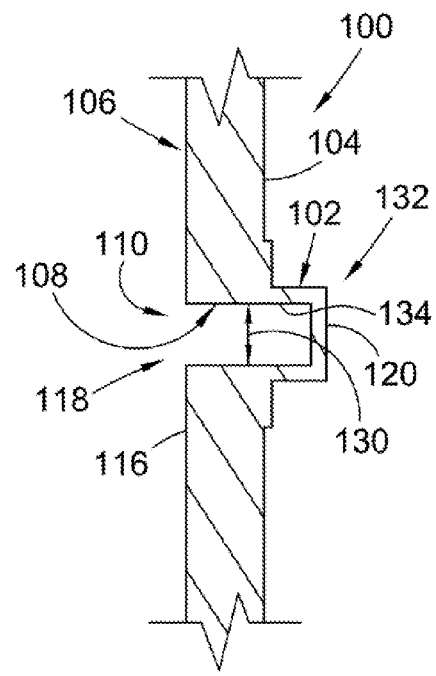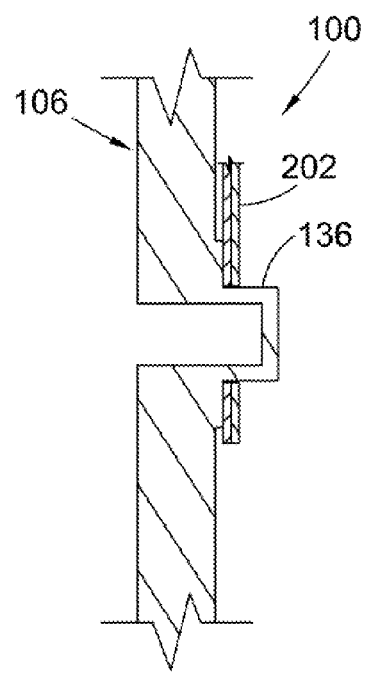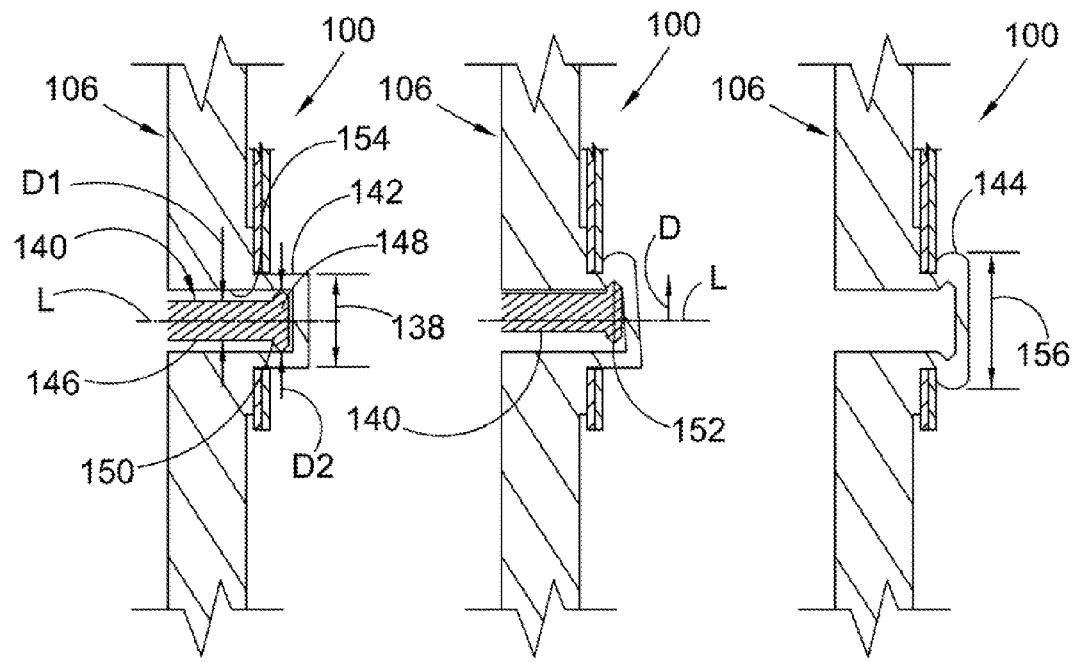
Fig. 2A  Fig. 2B  Fig. 2C  Fig. 2D  Fig. 2E

METHOD OF FORMING A RIVET AND SECURING A PIECE OF MATERIAL

CROSS-REFERENCE TO RELATED APPLICATIONS

This application claims the benefit under 35 U.S.C. §119 (e) of U.S. Provisional Application No. 61/196,149 filed Oct. 15, 2008, which application is incorporated herein by reference.

FIELD OF THE INVENTION

The invention relates to rivets, and in particular, to an internally expanding blind, hollow rivet.

BACKGROUND OF THE INVENTION

Extruded rivets are known. Known extruded rivets are used by applying force to both ends of the rivets.

BRIEF SUMMARY OF THE INVENTION

The present invention broadly comprises a rivet, including: at least one side wall extending from a first side of a sheet of material, formed from the same material as the sheet of material, and including respective inside surfaces; and a space at least partly enclosed by the respective inside surfaces. The space is open at a second side of the sheet of material. In one embodiment, the at least one side wall is cylindrical in shape. In another embodiment, the rivet includes an end wall formed of the same piece of material as the at least one side wall and defining one end of the space, the space is cylindrical in shape, the space has a first portion aligned with the sheet of material and a second portion partially defined by the end wall, and a diameter for the first portion is less than the diameter for the second portion.

The present invention also broadly comprises respective methods for forming a rivet and securing a piece of material.

It is a general object of the present invention to provide an internally expanding, blind, hollow rivet.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIG. 1 shows a present invention rivet; and,

FIGS. 2A through 2E illustrate a process for forming and using a present invention rivet.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

FIG. 1 shows a present invention rivet. Rivet 100 includes at least one side wall, for example, wall 102 extending from side 104 of sheet 106 of material. The side wall is integral and continuous with sheet 106, that is, the side wall is formed from the same material as the sheet of material. For example, the side wall is formed by punching or extruding sheet 106. The at least one side wall includes respective inside surfaces, for example, surface 108. Rivet 100 also includes space 110 at least partly enclosed by the respective inside surfaces, for example, by surface 108. Thus, space 110 is at least partly out of alignment with sheet 106. That is, with alignment referenced to a plane for the sheet, for example, along direction 112, the space extends in direction 114 beyond the plane of the sheet. In one embodiment, the at least one side wall is cylindrical in shape.

Space 110 is open at a side 116 of the sheet of material, for example, the space includes opening 118. The rivet includes end wall 120, integral and continuous with the at least one side wall, that is, formed of the same piece of material as the at least one side wall. The end wall defines end 122 of the space. Portion 124 of the space is aligned with the sheet of material and portion 126 of the space, including end 122 is partially defined by the end wall. Diameter 128 for the portion 124 is less than diameter 130 for portion 126.

FIG. 2A through 2E illustrate a present invention rivet and a process for forming and using a present invention rivet. The following should be viewed in light of FIGS. 1 through 2E. The following describes a present invention method for forming a rivet. Although the method is presented as a sequence of steps for clarity, no order should be inferred from the sequence unless explicitly stated. For example, as shown in FIG. 2A: a first step applies force to a portion of a sheet of material, for example, sheet 106, to form at least one side wall, for example, wall 102, of the rivet extending beyond a side, for example, side 104, for the sheet of material; and a second step forms a space, for example, space 110, at least partially defined by respective inside surfaces of the at least one wall, for example, surfaces 108. A third step opens the space at a second side of the sheet of material, for example as side 116. Thus the third step forms an opening, for example, opening 118 for the space.

As shown in FIG. 2A: a fourth step forms an end wall, for example, end wall 120, at a portion of the at least one side wall furthest from the sheet of material, for example, at portion 132; and a fifth step expands a diameter, for example, diameter 130, for a portion of the respective inside surfaces proximate the end wall, for example, portion 134. The forming steps described above can be implemented using any punching, extruding, or other fabricating process known in the art.

Tool 140 includes shaft 146 with diameter D1 and head 148 at end 150 of the shaft with diameter D2 greater than diameter D1. Tool 140 also includes surface 152 The at least one side wall includes respective outside surfaces, for example, surface 136, and as shown in FIG. 2D, a sixth step increases a diameter for the respective outside surfaces, for example, diameter 138. Tool 140 for the sixth step is shown in FIGS. 2C and 2D; however, the sixth step is not limited to the use of tool 140.

The following should be viewed in light of FIGS. 1 through 2E. The following describes a present invention method for securing a piece of material. Although the method is presented as a sequence of steps for clarity, no order should be inferred from the sequence unless explicitly stated. For example, as shown in FIG. 2A: a first step applies force to a portion of a first piece of material, for example, sheet 106, to form a cylindrical wall, for example, wall 102, extending beyond a first side for the sheet of material, for example, side 104, and to form an end wall, wall 120, continuous with the side wall and furthest from the first piece of material; a second step forms a space, for example, space 110, defined by an inside surface of the cylindrical wall, for example, surface 108 and the first piece of material, for example, sheet 106 and opening on one side of the first piece of material, for example, at opening 118. A third step, as shown in FIG. 2B, disposes a second piece or pieces of material, for example, pieces 202, about an outside surface, for example, surface 136, for the cylindrical wall. A fourth step, as shown in FIGS. 2C and 2D, expands a diameter, for example, diameter 130, for a portion of the inside surface proximate the end wall, for example, portion 134, to displace a portion of the outside surface of the wall, for example, portion 142. A fifth step, as shown in FIGS. 2D and 2E, fixes the second piece or pieces of material to the first piece of material with the displaced portion of the outside surface, for example, portion 144. For example, tool 140 is inserted through opening 118 and contacts inside surface 154 with head 148 and surface 152 to increase diameter 138 to diameter 156. In FIG. 2D, tool 140 has been displaced in direction D, orthogonal to line L passing through the space to expand diameter 138.

In one embodiment, a present invention rivet is used to blind attach a component, for example, a leaf spring, in a torque converter. That is, the rivet is accessible only from one side for the attachment process. For example, material 106 is part of a torque converter and piece 202 is a leaf spring.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

I claim:

1. A method of forming a rivet, comprising:
    applying force to a portion of a sheet of material to form at least one side wall of the rivet extending beyond a first side for the sheet of material and having an outer diameter;
    forming a space at least partially defined by respective inside surfaces of the at least one wall;
    forming an opening for the space at a second side of the sheet of material;
    inserting a tool through the opening; and,
    contacting the respective inside surfaces with a surface of the tool to increase the outer diameter for the at least one side wall, wherein contacting the respective inside surfaces with the surface of the tool to increase the outer diameter for the at least one side wall includes displacing the tool in a direction orthogonal to a line passing through the space.

2. The method of claim 1 further comprising:
    forming an end wall at a portion of the at least one side wall furthest from the sheet of material; and,
    expanding a diameter for a portion of the respective inside surfaces proximate the end wall.

3. The method of claim 2 wherein the at least one side wall includes respective outside surfaces and the method further comprising increasing a diameter for the respective outside surfaces.

4. The method of claim 1 wherein:
    the tool includes a shaft with a first diameter and a head, at an end of the shaft, with a second diameter greater than the first diameter; and,
    contacting the respective inside surfaces with a surface of the tool to increase the outer diameter for the at least one side wall includes contacting at least a portion of the respective inside surfaces with the head.

5. A method for securing a piece of material, comprising:
    applying force to a portion of a first piece of material to form a cylindrical wall extending beyond a first side for the first piece of material and to form an end wall continuous with the wall and furthest from the first piece of material;
    forming a space defined by an inside surface of the cylindrical wall and the first piece of material and opening on one side of the first piece of material;
    disposing a second piece of material about an outside surface for the cylindrical wall;
    inserting a tool, including a tool surface, into the space;
    contacting the inside surface with the tool surface;
    expanding, using the tool and the contact of the tool surface with the inside surface, a diameter for a portion of the inside surface proximate the end wall to displace a portion of the outside surface of the wall; and,
    fixing the second piece of material to the first piece of material with the displaced portion of the outside surface, wherein:
        the tool includes a shaft with a first diameter and a head, at an end of the shaft, with a second diameter greater than the first diameter; and,
        expanding, using the tool and the contact of the tool surface with the inside surface, the diameter for the portion of the inside surface proximate the end wall to displace the portion of the outside surface of the wall includes contacting the inside surface with the head.

6. The method of claim 5 wherein the first piece of material is a component for a torque converter and the second piece of material is a leaf spring.

7. The method of claim 5 wherein expanding, using the tool and the contact of the tool surface with the inside surface, the diameter for the portion of the inside surface proximate the end wall to displace the portion of the outside surface of the wall includes displacing the tool in a direction orthogonal to a line passing through the space.

* * * * *